(12) United States Patent
Jun (10) Patent No.: US 7,500,153 B2
(45) Date of Patent: Mar. 3, 2009

(54) METHOD AND SYSTEM FOR ERROR CORRECTION IN DISK DRIVE USING PLURAL RETRY TABLES

(75) Inventor: Jin-Wan Jun, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 577 days.

(21) Appl. No.: 10/872,588

(22) Filed: Jun. 21, 2004

(65) Prior Publication Data

US 2005/0015650 A1 Jan. 20, 2005

(30) Foreign Application Priority Data

Jul. 1, 2003 (KR) ................. 10-2003-0044347

(51) Int. Cl.
*G06F 11/00* (2006.01)
*G06F 11/14* (2006.01)
(52) U.S. Cl. .............. 714/54; 369/30.22; 369/53.35
(58) Field of Classification Search ............ 714/15, 714/769, 54; 369/30.22, 24, 53.35, 53.36
See application file for complete search history.

(56) References Cited

U.S. PATENT DOCUMENTS

| | | | | |
|---|---|---|---|---|
| 5,721,816 A | * | 2/1998 | Kusbel et al. ................. | 714/15 |
| 6,122,235 A | * | 9/2000 | Arai ........................ | 369/53.35 |
| 6,381,725 B1 | * | 4/2002 | Isokawa ..................... | 714/769 |
| 6,467,153 B2 | | 10/2002 | Butts et al. ................ | 29/603.03 |
| 6,545,832 B1 | * | 4/2003 | Sugawara et al. ............ | 360/53 |
| 6,611,392 B1 | * | 8/2003 | Hasebe ...................... | 360/53 |
| 6,687,194 B1 | * | 2/2004 | Kobayashi et al. ........ | 369/13.05 |
| 6,781,782 B2 | * | 8/2004 | Rochat et al. .............. | 360/75 |
| 7,002,765 B2 | * | 2/2006 | Lum et al. ................... | 360/53 |

OTHER PUBLICATIONS

Ontrack DataRecovery Glossary found at http://www.ontrack.com/glossary/.*
The Optical File Cabinet: a Random-Access File System for Write-once Optical Disks by Jason Gait published by IEEE Jun. 1988 ISSN: 0018-9162, CODEN: CPTRB4, Inspec Accession No. 3221184, Digital Object Identifier: 10.1109/2.947.*
English Abstract of Japanese Patent Application No. 1993-270132 to Kasada Toshiyuki et al.
English Abstract of Japanese Patent Application No. 1999-311798 to Kaneko Yuji et al.
Japanese Patent Application No. 10-232065 to Hiroshi published Mar. 3, 2000 (w/ English Abstract).
Japanese Patent Application No. 11-363978 to Yasuhiro published Jul. 6, 2001 (w/ English Abstract).
Korean Patent Application No. 10-1999-0044278 to Kazuya et al. published Jul. 25, 2000 (w/ English Abstract).

* cited by examiner

*Primary Examiner*—Scott T. Baderman
*Assistant Examiner*—Joseph Schell
(74) *Attorney, Agent, or Firm*—Monica H. Choi (57) ABSTRACT

A plurality of retry tables is used for adaptive and flexible error correction during a read/write operation within a disk drive. The plurality of retry tables is stored in a data storage unit, and one of the retry tables is selected to be used for the error correction. In addition, firmware is not modified for using any of the plurality of retry tables during the error correction. One of the retry tables becomes eventually selected as being optimum for the error correction depending on an application, operating conditions, and head/mechanical characteristics of the disk drive.

29 Claims, 8 Drawing Sheets

300

| Bits[31:28] | Bits[27:24] | Bits[23:20] | Bits[19:16] | Bits[15:12] | Bits[11:8] | Bits[7:0] |
|---|---|---|---|---|---|---|
| Overlay Data Field | Extra Field | Parameter(4) Value Field | Parameter(3) Value Field | Parameter(2) Value Field | Parameter(1) Value Field | Track Offset Value Field |

302

| Bits[31:28] | Bits[27:24] | Bits[23:20] | Bits[19:16] | Bits[15:12] | Bits[11:8] | Bits[7:0] |
|---|---|---|---|---|---|---|
| Overlay Data Field | Extra Field | Parameter(4) Range #1 | Parameter(3) Range #1 | Parameter(2) Range #1 | Parameter(1) Range #1 | Track Offset Range #1 |

304

| Bits[31:28] | Bits[27:24] | Bits[23:20] | Bits[19:16] | Bits[15:12] | Bits[11:8] | Bits[7:0] |
|---|---|---|---|---|---|---|
| Overlay Data Field | Extra Field | Parameter(4) Range #2 | Parameter(3) Range #2 | Parameter(2) Range #2 | Parameter(1) Range #2 | Track Offset Range #2 |

306

| Bits[31:28] | Bits[27:24] | Bits[23:20] | Bits[19:16] | Bits[15:12] | Bits[11:8] | Bits[7:0] |
|---|---|---|---|---|---|---|
| Overlay Data Field | Extra Field | Parameter(4) Range #3 | Parameter(3) Range #3 | Parameter(2) Range #3 | Parameter(1) Range #3 | Track Offset Range #3 |

| Bits[31:28] | Bits[27:24] | Bits[23:20] | Bits[19:16] | Bits[15:12] | Bits[11:8] | Bits[7:0] |
|---|---|---|---|---|---|---|
| Overlay Data Field | Extra Field | Parameter(4) Value Field | Parameter(3) Value Field | Parameter(2) Value Field | Parameter(1) Value Field | Track Offset Value Field |

300

| Bits[31:28] | Bits[27:24] | Bits[23:20] | Bits[19:16] | Bits[15:12] | Bits[11:8] | Bits[7:0] |
|---|---|---|---|---|---|---|
| Overlay Data Field | Extra Field | Parameter(4) Range #1 | Parameter(3) Range #1 | Parameter(2) Range #1 | Parameter(1) Range #1 | Track Offset Range #1 |

302

| Bits[31:28] | Bits[27:24] | Bits[23:20] | Bits[19:16] | Bits[15:12] | Bits[11:8] | Bits[7:0] |
|---|---|---|---|---|---|---|
| Overlay Data Field | Extra Field | Parameter(4) Range #2 | Parameter(3) Range #2 | Parameter(2) Range #2 | Parameter(1) Range #2 | Track Offset Range #2 |

304

| Bits[31:28] | Bits[27:24] | Bits[23:20] | Bits[19:16] | Bits[15:12] | Bits[11:8] | Bits[7:0] |
|---|---|---|---|---|---|---|
| Overlay Data Field | Extra Field | Parameter(4) Range #3 | Parameter(3) Range #3 | Parameter(2) Range #3 | Parameter(1) Range #3 | Track Offset Range #3 |

METHOD AND SYSTEM FOR ERROR CORRECTION IN DISK DRIVE USING PLURAL RETRY TABLES

CROSS-REFERENCE TO RELATED APPLICATION(s)

The present application claims priority under 35 U.S.C. § 119 to Korean Patent Application No. 2003-44347, filed on Jul. 1, 2003, which is incorporated herein by reference in its entirety.

TECHNICAL FIELD

The present invention relates generally to disk drives such as HDD's (hard disk drives), and more particularly, to a method and system for performing error correction in disk drives using a plurality of retry tables without modification of firmware.

BACKGROUND OF THE INVENTION

Figure 1:
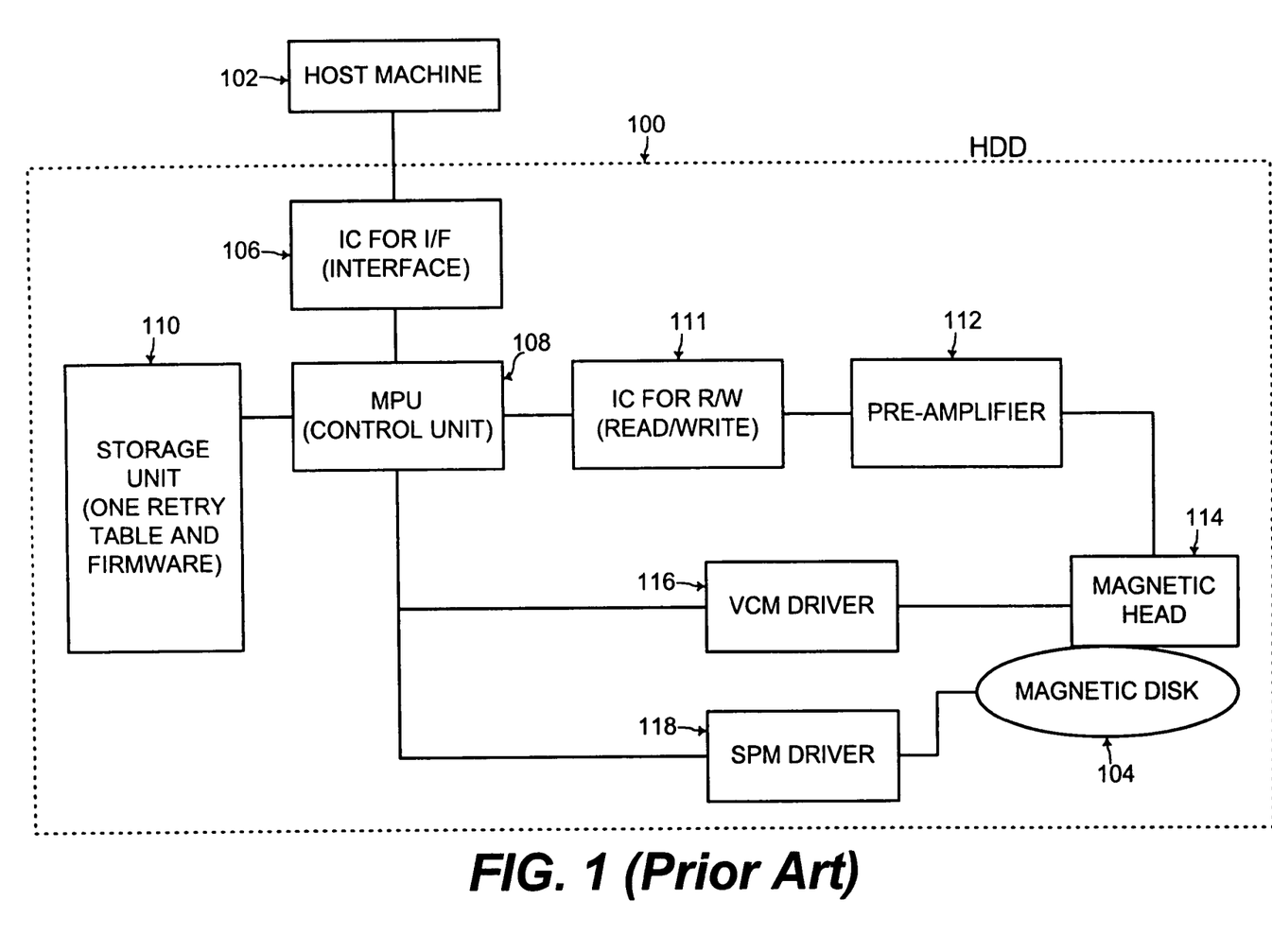
FIG. 1 shows components of a conventional disk drive, according to the prior art.

FIG. 1 shows a block diagram of a disk drive 100 such as a HDD (hard disk drive) for example that stores data magnetically. A host machine 102 accesses the disk drive 100 for reading/writing data from/to a magnetic disk 104 within the disk drive 100. The disk drive 100 includes an interface IC (integrated circuit) 106 between the host machine 102 and the disk drive 100.

A MPU (main processing unit) 108 is a data processor that controls operation of the components of the disk drive 100 and is coupled to the interface IC 106. The MPU 108 is also coupled to a data storage unit 110 that typically stores a retry table and firmware for error correction with the retry table during read/write of data from/to the magnetic disk 104.

In addition, the MPU 108 is coupled to a read/write IC (integrated circuit) 111 for performing the read/write of data from/to the magnetic disk 104. A pre-amplifier 112 amplifies signals from/to a magnetic head 114 used for reading/writing data from/to the magnetic disk 104. The MPU 108 controls a VCM (voice coil motor) driver 116 that moves the magnetic head 114 with respect to the magnetic disk 104. The MPU 108 also controls a SPM (spindle motor) driver 118 that rotates the magnetic disk 104 with respect to the magnetic head 114. Such components of FIG. 1 and such operation of these components of the disk drive 100 are known to one of ordinary skill in the art as disclosed in U.S. Pat. No. 6,381,725.

Figure 2:
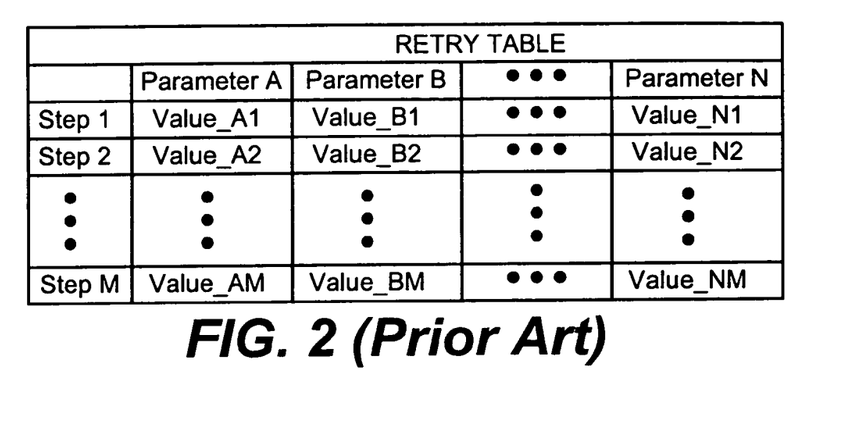
FIG. 2 illustrates an example retry table used for error correction during a read/write operation within the disk drive of FIG. 1, according to the prior art.

FIG. 2 illustrates a retry table stored within the data storage unit 110 and used during error correction when reading/writing data from/to the magnetic disk 104. The table includes a plurality of parameters, including parameters A through N, used for determining the conditions of the read/write operation. For example, parameter A indicates the value of current to be sourced through the magnetic head 114 during a read/write operation, parameter B indicates the value of track offset for the tracking mechanism of the magnetic head 114, parameter C indicates a value of cutoff frequency for a low-pass filter within the read/write IC 111, and so on. Each row of the table of FIG. 2 has a different value for each of such parameters A through N.

Figure 3:
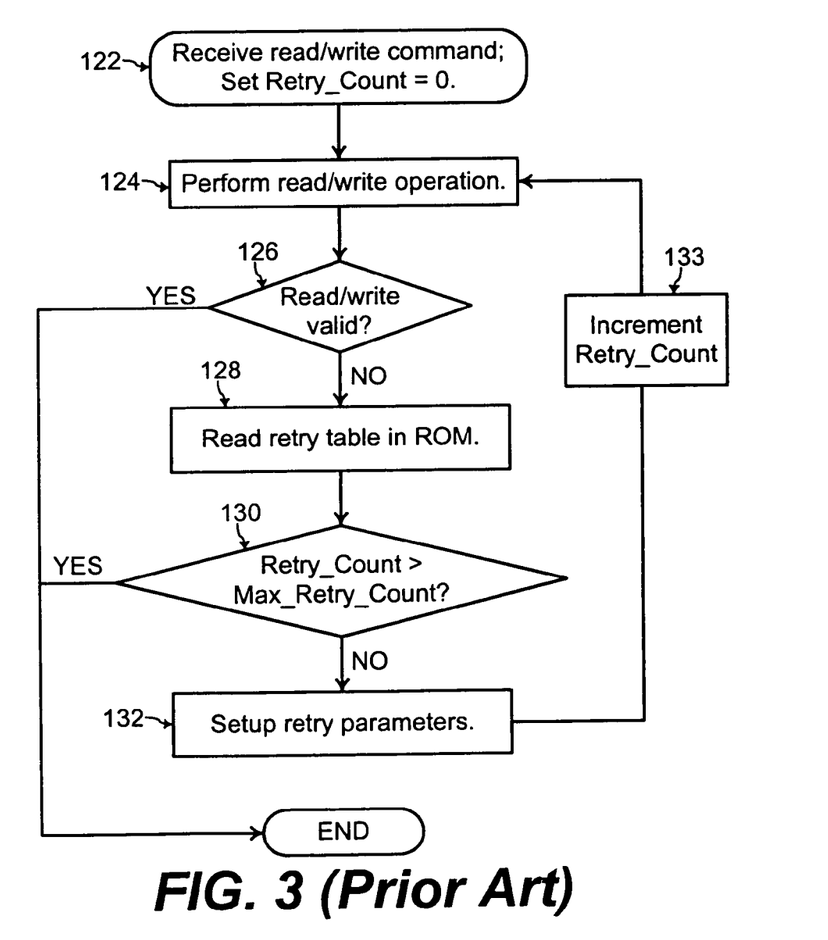
FIG. 3 shows a flowchart of steps performed for a read/write operation within the disk drive of FIG. 1 with error correction using the retry table of FIG. 2, according to the prior art.

FIG. 3 shows a flowchart of steps performed by the MPU 108 when executing the sequences of instructions (i.e., the firmware) stored within the data storage unit 110. The data storage unit 110 is typically a PROM (programmable read only memory) that stores the retry table of FIG. 2 and the sequences of instructions (i.e., the firmware) to be executed by the MPU 108 for performing the steps of FIG. 3. FIG. 3 includes the steps for performing error correction using the retry table of FIG. 2 during read/write of data from/to the magnetic disk 104.

Referring to FIG. 2, the MPU 108 receives a read/write command from the host machine 102 (step 122 of FIG. 3). The MPU 108 controls the components 111, 116, and 118 to perform the read/write of data from/to the magnetic disk 104 as specified from the host machine 102 (step 124 of FIG. 3). The MPU 108 also determines whether an error occurred during the read/write operation (step 126 of FIG. 3). Mechanisms for determining whether such an error occurred are known to one of ordinary skill in the art.

If an error did occur, the read/write operation is determined to be invalid and to be valid otherwise. If the read/write operation is determined to be valid, the process for the read/write operation ends successfully. If the read/write operation is determined to be invalid, the MPU 108 reads the retry table of FIG. 2 from the data storage unit 110 (step 128 of FIG. 3).

The MPU 108 determines whether a variable Retry_Count is greater than a specified number Max_Retry_Count (step 130 of FIG. 3). Retry_Count is initialized to zero when the read/write command is received (step 122 of FIG. 3) and keeps a count of the number of retries for the read/write operation. Max_Retry_Count specifies a maximum number of retries for the read/write operation to be performed by the MPU 108. If Retry_Count is greater than Max_Retry_Count, the read/write operation ends typically with a warning message that the read/write operation failed.

If Retry_Count is not greater than Max_Retry_Count, the MPU 108 configures the components 111, 116, and 118 to retry the read/write operation with values of the parameters A through N as specified by a first row (step 1 in FIG. 2) in the retry table of FIG. 2 (steps 132 and 124 of FIG. 3). In addition, the MPU 108 increments Retry_Count for every performance of the read/write step 124 (step 133 of FIG. 3). Steps 124, 126, 128, 130, 132, and 133 are repeated with each subsequent row of the retry table of FIG. 2, until the read/write operation is determined to be valid or until Retry_Count is greater than Max_Retry_Count, at which point the read/write operation ends.

In the prior art, one retry table with the corresponding firmware for error correction using such a retry table is stored within the data storage unit 110. However, the range of values for the parameters A though N in the retry table of FIG. 2 may be desired to be different for different applications, operating conditions, and head/mechanical characteristics of the disk drive 100. For example, a disk drive used within a PC (personal computer) typically has different operating conditions and head/mechanical characteristics from a disk drive used within an A/V (audio visual) system.

In the prior art, another retry table with corresponding firmware for using that different retry table is programmed into the data storage unit 110 for each of the different applications, operating conditions, and head/mechanical characteristics of the disk drive. However, programming the data storage unit 110 (typically a PROM device) for each of the different applications, operating conditions, and head/mechanical characteristics of the disk drive is time-consuming and costly. For example, verification of the compatibility between each firmware programmed into the data storage unit 102 and the MPU 108 may be time-consuming and costly. Nevertheless, the firmware typically needs to be modified for a change of the retry table in the prior art.

In addition in the prior art, a skilled production engineer (who may make an error in human judgment) keeps track of various retry tables for the different applications, operating conditions, and head/mechanical characteristics of the disk drive. Furthermore, a fixed retry table of the prior art within the data storage unit 110 is not amenable for adaptive and flexible error correction within the disk drive 100.

Thus, adaptive and flexible error correction is desired for read/write operations within a disk drive without modification of the firmware used for such error correction.

SUMMARY OF THE INVENTION

Accordingly, in a general aspect of the present invention, a plurality of retry tables is used for adaptive and flexible error correction.

In one embodiment of the present invention, in a method and system for performing error correction in a disk drive, the plurality of retry tables is stored in a data storage unit, and one of the retry tables is selected to be used for the error correction. In addition, the firmware is not modified for using any of the plurality of retry tables during the error correction.

In another embodiment of the present invention, one of the retry tables becomes eventually selected as being optimum for error correction depending on the application, operating conditions, and head/mechanical characteristics of the disk drive. The data storage unit for storing the plurality of retry tables is one of a maintenance cylinder of the disk of the disk drive or a memory unit apart from the disk of the disk drive. In a further embodiment, the error correction is performed during an intelligent burn-in test for manufacturing the disk drive.

In this manner, use of a plurality of retry tables is supported in the present invention without modification of firmware to eliminate time, cost, and human skill needed in changing of a retry table and the corresponding firmware for using the retry table. In addition, the present invention provides adaptive and flexible error correction during a read/write operation within the disk drive because a plurality of retry tables is available for error correction.

These and other features and advantages of the present invention will be better understood by considering the following detailed description of the invention which is presented with the attached drawings.

The figures referred to herein are drawn for clarity of illustration and are not necessarily drawn to scale. Elements having the same reference number in FIGS. 1, 2, 3, 4, 5, 6, 7, 8, 9, 10, and 11 refer to elements having similar structure and function.

DETAILED DESCRIPTION

Figure 4:
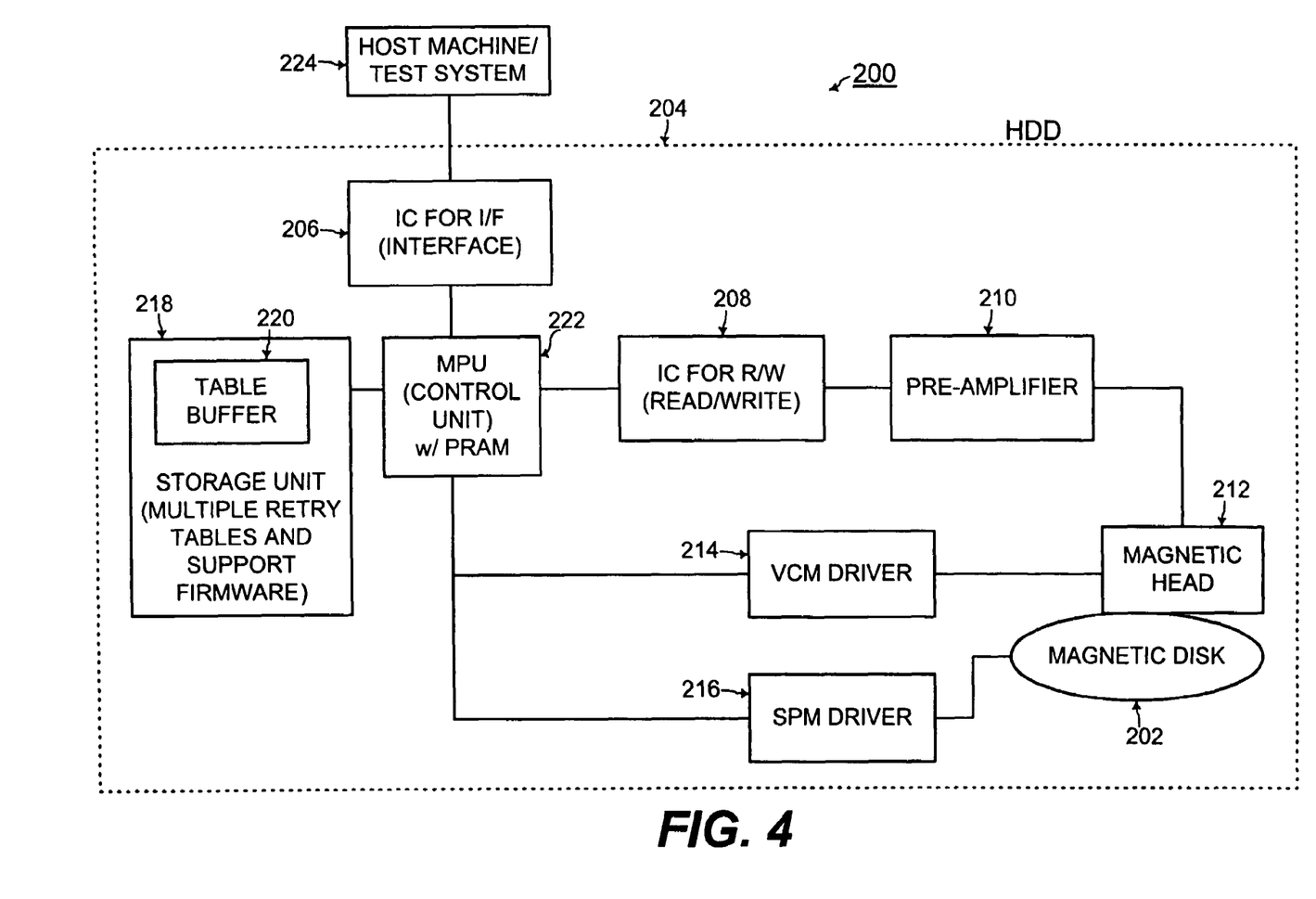
FIG. 4 shows components of a disk drive including a mechanism for using a plurality of retry tables for error correction, according to an example embodiment of the present invention.

FIG. 4 shows a system 200 for reading/writing data from/to a disk 202 within a disk drive 204 with error correction according to an example embodiment of the present invention. The disk drive 204 may be for a HDD (hard disk drive) for example that stores data magnetically. The disk drive 204 includes an interface IC (integrated circuit) 206, a read/write IC (integrated circuit) 208, a preamplifier 210, a magnetic head 212, a VCM (voice coil motor) driver 214, and a SPM (spindle motor) driver 216, similar in general operation as described for such components in reference to FIG. 1.

The disk drive 204 also includes a data storage unit 218 having a plurality of retry tables stored thereon and having a table buffer 220 therein. The present invention may also be practiced with the table buffer 220 implemented within any other data storage device apart from the data storage unit 218. In addition, support firmware for using such retry tables during error correction for a read/write operation is also stored in the data storage unit 218. A MPU (main processing unit) 222 with a PRAM (programmable random access memory) is a data processor for controlling operation of the components of the disk drive 204.

In the system 200, the disk drive 204 interfaces via the IC 206 with a host machine or a test system, 224. The host machine is typically part of a host system such as a computer system or an A/V (audio visual) system having the disk drive 204 installed therein. The test system is typically used for ensuring proper operation of the disk drive 204 during manufacture of the disk drive 204 before being installed into a host system.

Figure 5:
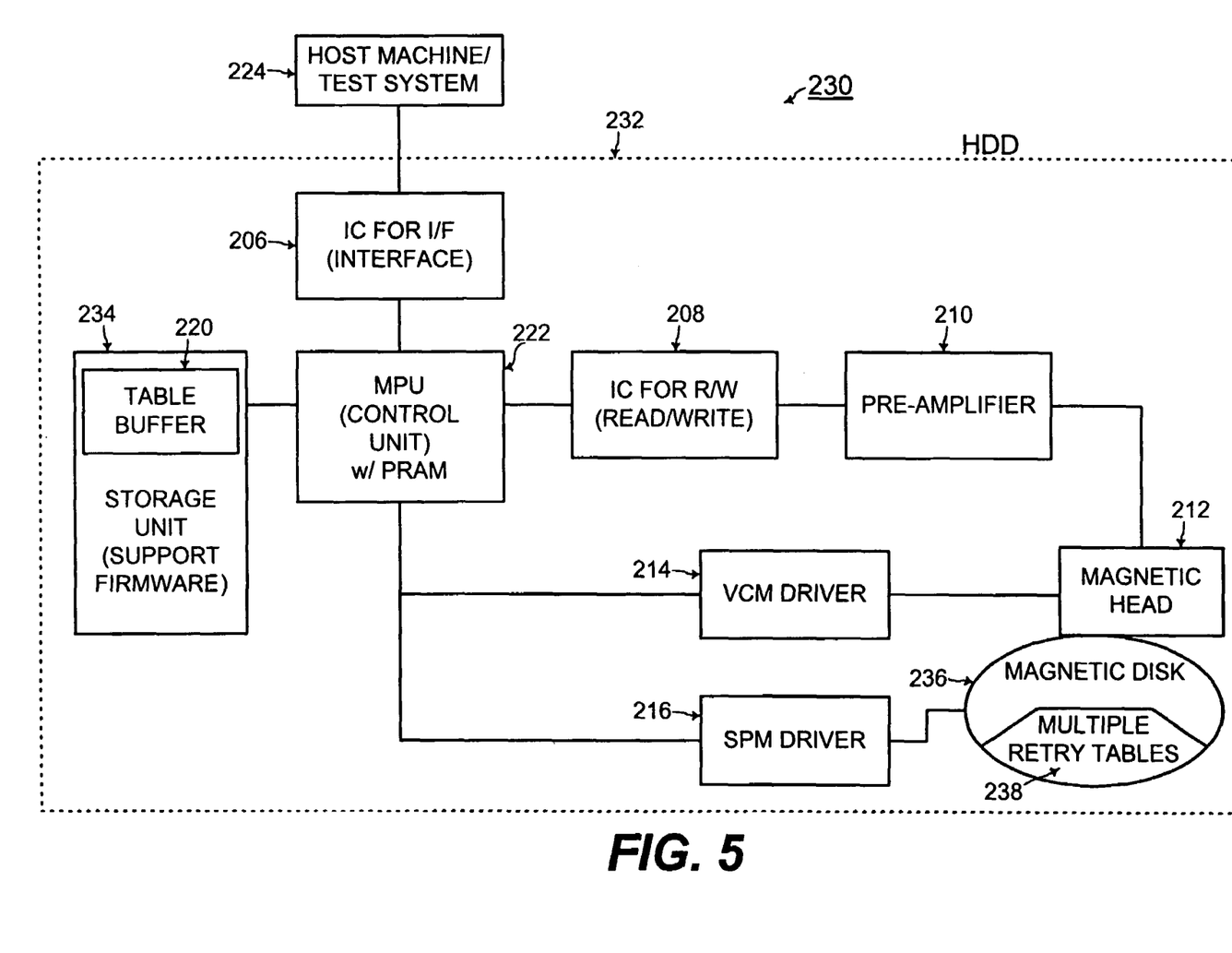
FIG. 5 shows components of a disk drive including a mechanism for using a plurality of retry tables for error correction, according to another example embodiment of the present invention.

FIG. 5 shows a block diagram of a system 230 with a disk drive 232 according to another example embodiment of the present invention. Elements having the same reference number in FIGS. 4 and 5 refer to elements having similar structure and function. However in FIG. 5, a data storage unit 234 no longer has the plurality of retry tables stored thereon. Rather, the plurality of retry tables is stored in a maintenance cylinder 238 of a disk 236. A maintenance cylinder which is a portion of a magnetic disk is in general known to one of ordinary skill in the art. The data storage unit 234 still stores the support firmware for performing error correction using the plurality of retry tables. The data storage unit 218 of FIG. 4 or 234 of FIG. 5 may be implemented with any type and number of memory devices as known to one of ordinary skill in the art.

Figure 6:
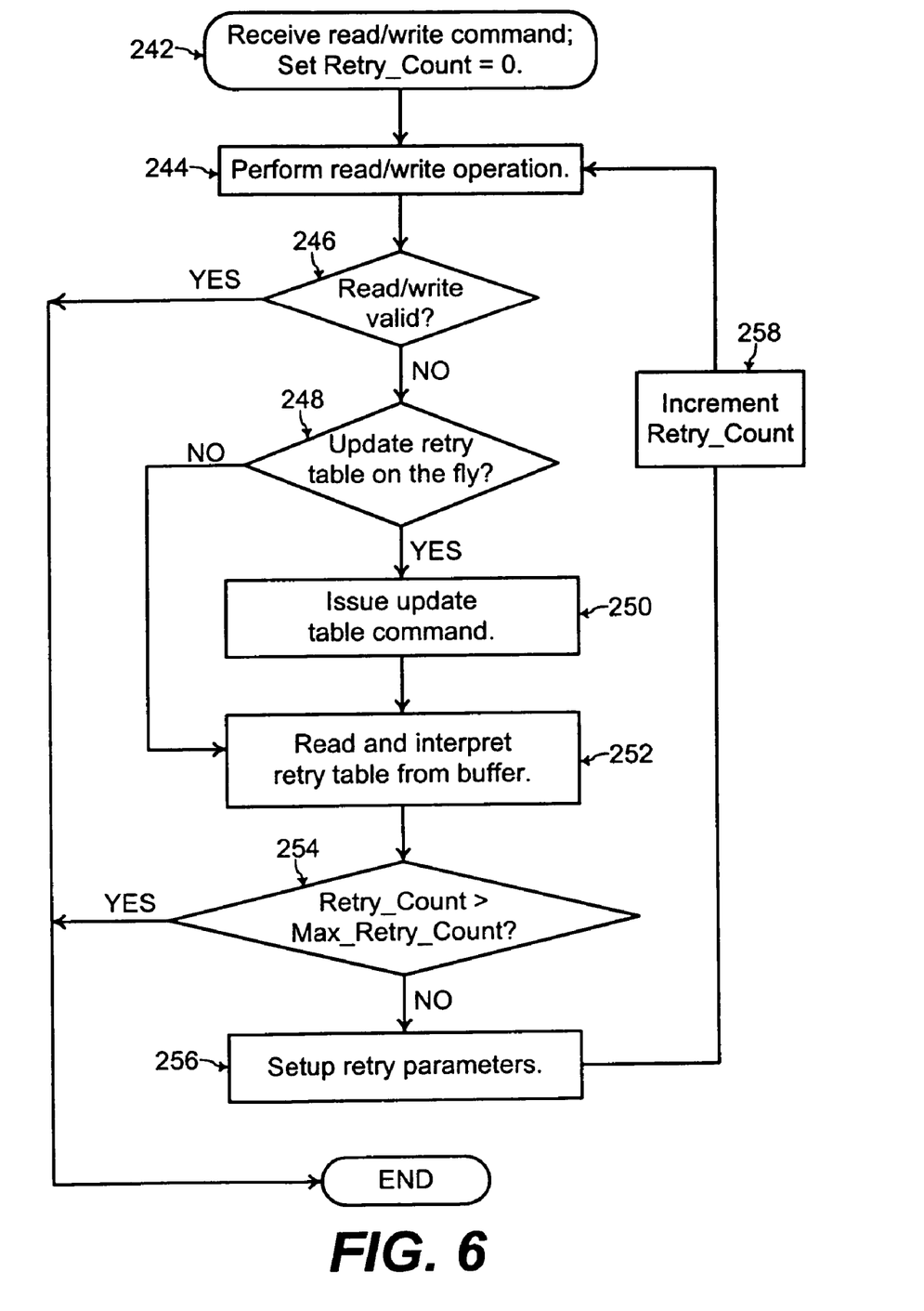
FIG. 6 shows a flowchart of steps performed for a read/write operation within the disk drive of FIG. 4 or 5, according to an example embodiment of the present invention.

FIG. 6 shows a flowchart of steps performed by the system 200 of FIG. 4 or 230 of FIG. 5 during a read/write operation by the disk drive 204 or 232. The MPU 222 performs such steps when executing the sequences of instructions (i.e., the support firmware) stored within the data storage unit 218 or 234. The MPU 222 receives a command from the host machine/test system 224 for a read/write operation via the interface IC 206 (step 242 of FIG. 6). The MPU 222 controls the components 208, 214, and 216 to perform the read/write of data from/to the magnetic disk 202 or 236 as specified from the host machine/test system 224 (step 244 of FIG. 6).

The MPU 222 also determines whether an error occurred during the read/write operation (step 246 of FIG. 6). Mechanisms for determining whether such an error occurred are known to one of ordinary skill in the art. If an error did occur, the read/write operation is determined to be invalid and to be valid otherwise. If the read/write operation is determined to be valid, the process for the read/write operation ends successfully. If the read/write operation is determined to be invalid, the MPU 222 uses one of the plurality of retry tables stored in the data storage unit 218 or in the maintenance cylinder 238 (steps 248, 250, and 252 of FIG. 6) for performing error correction.

Figure 7:
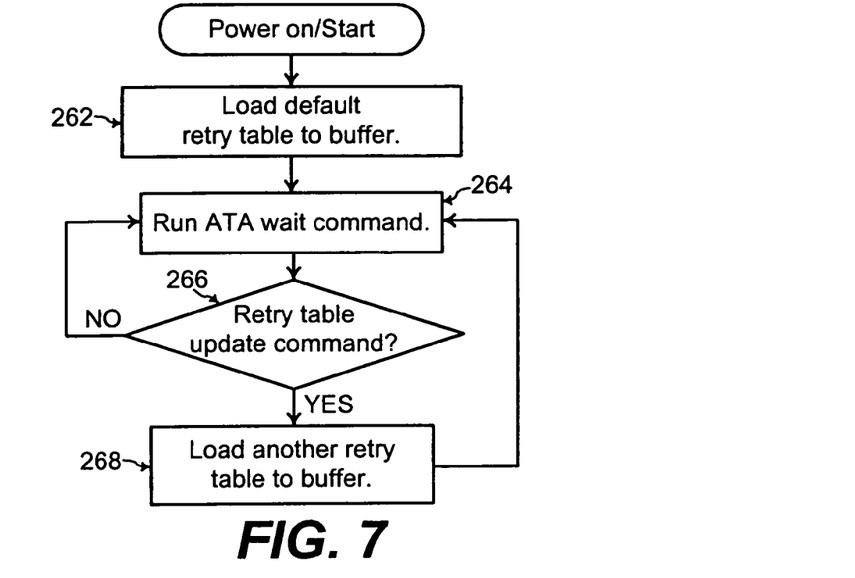
FIG. 7 shows a flowchart of steps of a subroutine for updating to another retry table during error correction, according to an example embodiment of the present invention.

The MPU 222 selects one of the plurality of retry tables to be used during correction for the failed read/write operation. FIG. 7 shows a flowchart of steps in a subroutine for selecting one of the plurality of tables when invoked at step 250 by the main process of FIG. 6, in an example embodiment of the present invention. Referring to FIG. 7, upon power on, a default retry table is selected and loaded into the table buffer 220 (step 262 of FIG. 7).

The MPU 222 runs an ATA wait command (step 264 of FIG. 7) and periodically checks for whether a table update command is issued from the main process of FIG. 6 (step 266 of FIG. 7). ATA commands are a standard set of commands run by disk drives for interfacing with the host machine/test system 224, as known to one of ordinary skill in the art. As long as the table update command is not issued from the main process of FIG. 6, the MPU 222 runs the ATA wait command (steps 264 and 266 of FIG. 7).

The MPU 222 issues the table update command in step 250 of FIG. 6 if the default table is not appropriate for the application, operating conditions, and head/mechanical characteristics of the disk drive 204 or 232. Alternatively, the MPU 222 also issues the table update command in step 250 of FIG. 6 when the MPU 222 determines that a second retry table is desired from analyzing the past pattern of retries using a first retry table.

In any case, if the table update command is issued from the main process of FIG. 6, step 268 is performed in FIG. 7 to select and load another retry table into the table buffer 220. In the example embodiment of FIG. 4, one of the plurality of retry tables is selected and loaded from the data storage unit 218 into the table buffer 220. In the example embodiment of FIG. 5, one of the retry tables is selected and loaded from the maintenance cylinder 238 of the disk 236 into the table buffer 220.

In this manner, with the subroutine of FIG. 7, the MPU 222 runs the ATA wait command with a first one of the plurality of retry tables selected and loaded into the table buffer 220 as long as the table update command is not issued from the main process of FIG. 6. When the table update command is issued from the main process of FIG. 6, the MPU 222 selects and loads a second one of the plurality of retry tables into the table buffer 220.

Figure 8:
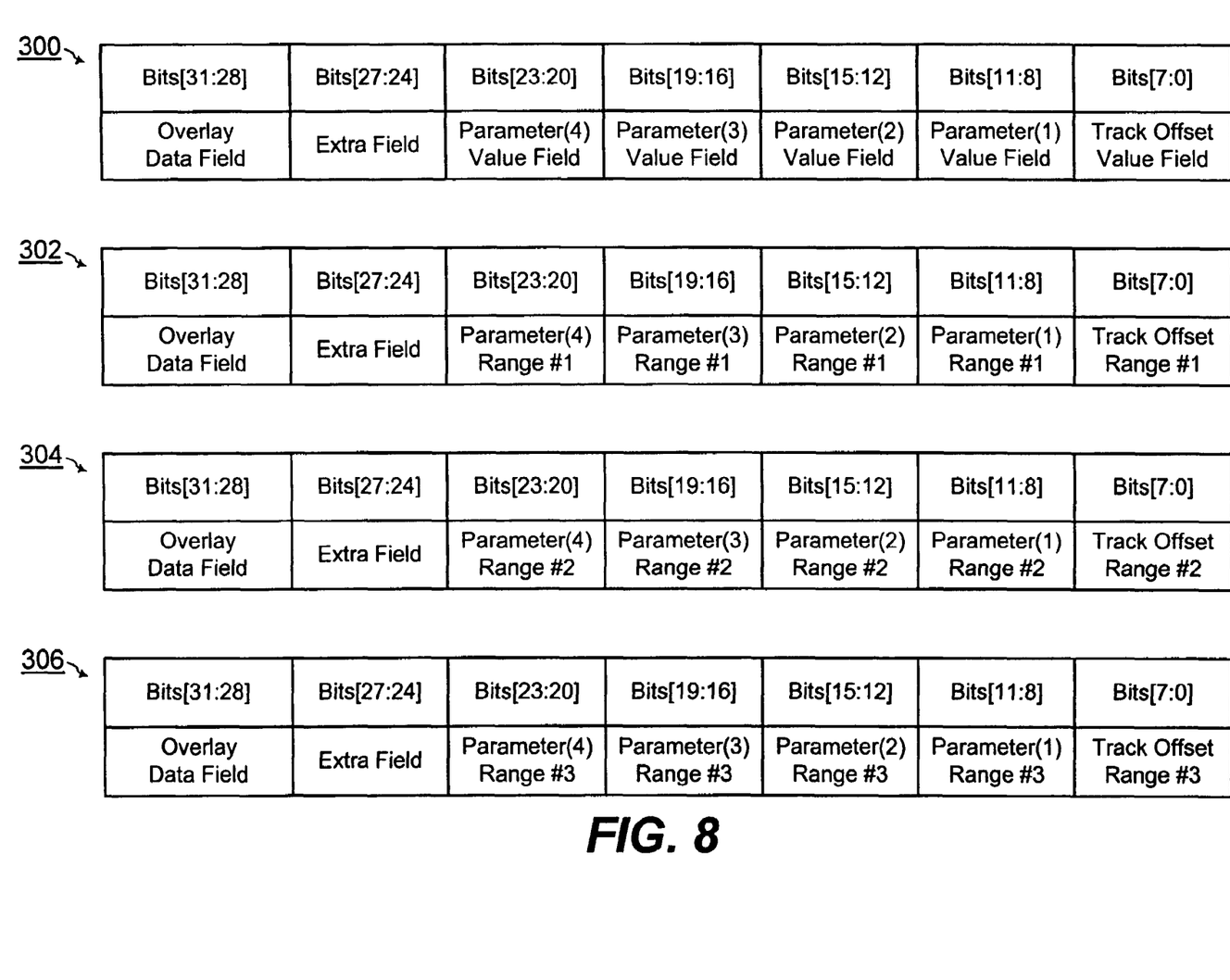
FIG. 8 illustrates examples of the plurality of retry tables used for error correction within the disk drive, according to an example embodiment of the present invention.

FIG. 8 illustrates a plurality of retry tables used in an example embodiment of the present invention including first, second, and third retry tables 302, 304, and 306, respectively. A generic retry table 300 is implemented with two-words (i.e., thirty-two bits) divided into a plurality of fields. Bits [7:0] are assigned for a track offset value field which determines an amount of track offset for the magnetic head 212 in the tracking mechanism of the disk drive. In additions, bits [11:8], bits[15:12], bits[19:16], and bits[23:20] are assigned for parameter(1), parameter(2), parameter(3), and parameter (4), respectively, that determine the operating conditions of the read/write operation.

For example, bits [11:8] are for specifying the value of parameter(1) which is the current to be sourced through the magnetic head 114 during the read/write operation. Bits [15:12] are for specifying the value of parameter(2) which is the cutoff frequency for a low-pass filter within the read/write IC 208, and so on. Bits[27:24] are assigned for an extra field that may be used for any unpredicted retry table parameter. Bits [31:28] are assigned for indicating an overlay retry code to be executed as will be further described herein.

In the example of FIG. 8, each of the plurality of retry tables 302, 304, and 306 has a plurality of rows for a different range of values for any of the fields, bits[31:28], bits[27:24], bits [23:20], bits[19:16], bits[15:12], bits[11:8], and bits[7:0]. For example, the first table 302 has a respective first range of values for each of parameter(1), parameter(2), parameter(3), parameter(4), and the track offset. The second table 304 has a respective second range of values for each of parameter(1), parameter(2), parameter(3), parameter(4), and the track offset. The third table 306 has a respective third range of values for each of parameter(1), parameter(2), parameter(3), parameter(4), and the track offset.

Referring to FIGS. 6 and 8, at step 248 of FIG. 6, the MPU 222 analyzes a pattern of the read/write retry results performed with the first retry table 302. If the MPU 222 determines from such a pattern that the first range of values for parameter(1), parameter(2), parameter(3), parameter(4), and the track offset is not sufficient for error correction, the MPU 222 issues the update table command to the subroutine of FIG. 7 (step 250 of FIG. 6). With such an update table command, the subroutine of FIG. 7 selects and loads the second retry table 304 into the table buffer 220.

Subsequently, with use of the second retry table 304 for error correction, the MPU 222 analyzes a pattern of the read/write retry results performed with the second retry table 304. If the MPU 222 determines from such a pattern that the second range of values for parameter(1), parameter(2), parameter(3), parameter(4), and the track offset is not sufficient for error correction, the MPU 222 issues the update table command to the subroutine of FIG. 7 (step 250 of FIG. 6). With such an update table command, the subroutine of FIG. 7 selects and loads the third retry table 306 into the table buffer 220, and so on for any number of retry tables.

Figure 9:
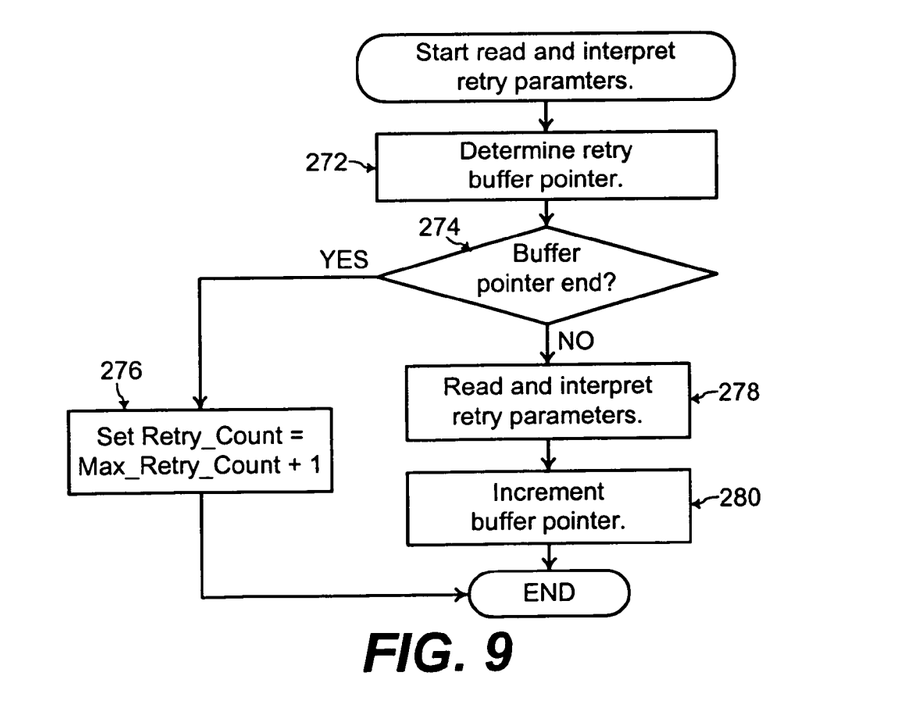
FIG. 9 shows a flowchart of steps of a subroutine for reading and interpreting retry parameters, according to an example embodiment of the present invention.

In any case, with a selected retry table loaded into the table buffer 220 after step 248 or 250 in FIG. 6, the MPU 222 issues a command for reading and interpreting such a selected retry table (step 252 of FIG. 6). FIG. 9 shows a flowchart of steps in a subroutine for reading and interpreting the selected retry table when invoked at step 252 by the main process of FIG. 6. Referring to FIG. 9, the MPU 222 determines a retry buffer pointer for the selected retry table within the table buffer 220 (step 272 of FIG. 9). The selected retry table has a plurality of rows, and the retry buffer pointer indicates the row of data to be read from the selected retry table.

In an example embodiment, the retry buffer pointer typically points to a beginning row of the selected retry table immediately after the selected retry table is loaded into the table buffer 220. Then, the retry buffer pointer is incremented to each subsequent row after a row of parameters of the selected retry table has been used for a retry of the read/write operation.

Alternatively, if the ranges for a parameter of the plurality of retry tables overlap, the MPU 222 may control the retry buffer pointer to point to a middle row immediately after a newly selected retry table is loaded into the table buffer 220. By controlling the retry buffer pointer to point to a middle row in such a situation, overlapping parameter values already used in past retries of the read/write operation are not used again.

In any case, the retry buffer pointer is a mechanism for indicating a selected row of parameters to be used for retry among the plurality of retry tables. Thus, the retry buffer pointer is used in an example embodiment of the present invention for moving among and through the plurality of retry tables. Buffer pointers used with tables in general are known to one of ordinary skill in the art.

The MPU 222 then determines if the retry buffer pointer is at an end for the plurality of retry tables (step 274 of FIG. 9). The retry buffer pointer is a location indicator among the plurality of retry tables in the example embodiment of the present invention. If the MPU 222 determines that the retry buffer pointer is at the end for the plurality of retry tables, a variable Retry_Count is set to be Max_Retry_Count+1 (step 276 of FIG. 9) with Max_Retry_Count being a specified number. Also in that case, the subroutine of FIG. 9 ends to return to step 254 of the main process in FIG. 6.

If the retry buffer pointer is not at the end for the plurality of retry tables, the MPU 222 reads and interprets the retry parameters for the current row of the selected retry table as indicated by the retry buffer pointer (step 278 of FIG. 9). Also in that case, the MPU 222 increments the buffer pointer (step 280 of FIG. 9) and returns to step 254 of the main process in FIG. 6. For interpreting the retry parameters in step 278, the MPU 222 determines how to control the components within the disk drive 204 or 232 with such retry parameters as read with the retry buffer pointer.

Referring back to the main process of FIG. 6, after the subroutine of FIG. 9, the MPU 222 determines whether Retry_Count is greater than Max_Retry_Count (step 254 of FIG. 6). Retry_Count is initialized to zero when the read/write command is received (step 242 of FIG. 6) and keeps a count of the number of retries for the read/write operation. Max_Retry_Count is a maximum number of retries for the read/write operation to be performed by the MPU 222. If Retry_Count is greater than Max_Retry_Count, then the read/write operation ends typically with a warning message that the read/write operation failed.

Figure 10:
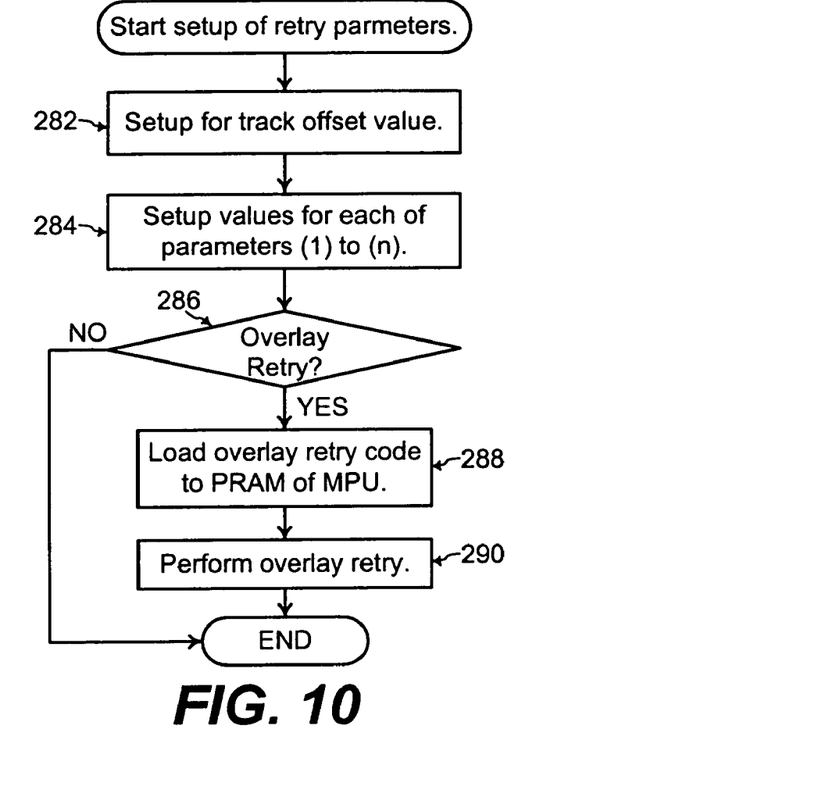
FIG. 10 shows a flowchart of a subroutine for setting up retry parameters, according to an example embodiment of the present invention.

If Retry_Count is not greater than Max_Retry_Count, the MPU 222 sets up the retry parameters (step 256 of FIG. 6) to retry the read/write operation. FIG. 10 shows a flowchart of steps in a subroutine for setup of the retry parameters when invoked at step 256 in the main process of FIG. 6, in an example embodiment of the present invention. Referring to FIGS. 8 and 10, the track offset with the tracking mechanism of the disk drive 204 or 232 is setup with the value specified in bits[7:0] (step 282 of FIG. 10).

In addition, the respective condition for each of parameter (1), parameter(2), parameter(3), and parameter(4) is setup with the respective values specified in bits[11:8], bits[15:12], bits[19:16], and bits[23:20] (step 284 of FIG. 10). For example, bits [11:8] specify the value of parameter(1) which is the current to be sourced through the magnetic head 114 during the read/write operation. The MPU controls the read/write IC 208 to source this value of current through the magnetic head. Bits [15:12] specify the value of parameter(2) which is the cutoff frequency for a low-pass filter within the read/write IC 208. The MPU controls the read/write IC 208 to perform low-pass filtering with this cutoff frequency, and so on for parameter(3) and parameter(4).

In addition in FIG. 10, the MPU determines whether an overlay retry code is specified by bits[31:28] (step 286 of FIG. 10). An overlay retry code is additional action to be performed during the retry such as testing for an unstable state of the magnetic head 212 for example. Overlay retry codes in general are known to one of ordinary skill in the art of disk drives. If an overlay retry code is specified, the MPU 222 loads the overlay retry code into the PRAM of the MPU 222 (step 288 of FIG. 10). Subsequently, the MPU 222 performs the overlay retry code (step 290 of FIG. 10), and the subroutine of FIG. 10 ends to return to step 258 of the main process in FIG. 6. If no overlay retry code is specified, the subroutine of FIG. 10 ends after setup of the track offset, parameter(1), parameter(2), parameter(3), and parameter(4) to return to step 258 of the main process in FIG. 6.

Referring back to the main process of FIG. 6, after setup of the retry parameters in step 256, the MPU 222 increments Retry_Count (step 258 of FIG. 6) and performs the read/write step 244 again. Steps 244, 246, 248, 250, 252, 254, 256, and 258 are repeated, until the read/write operation is determined to be valid or until Retry_Count is greater than Max_Retry_Count, at which point the read/write operation ends.

When the read/write operation is determined to be valid, the read/write operation ends successfully. When the read/write operation ends because Retry_Count is greater than Max_Retry_Count, the read/write operation has failed even after attempts for error correction. In that case, a warning message of such failure may be generated by the MPU 222.

In this manner, one of the retry tables becomes eventually selected as being optimum for error correction depending on the application, operating conditions, and head/mechanical characteristics of the disk drive 204 or 232. Furthermore, use of the plurality of retry tables is supported in the present invention without modification to firmware to eliminate time, cost, and human skill needed in changing a retry table and corresponding firmware. In addition, the present invention provides adaptive and flexible error correction during a read/write operation within the disk drive 204 or 232 because a plurality of retry tables is available for error correction.

The foregoing is by way of example only and is not intended to be limiting. For example, the present invention is described in reference to an example disk drive 204 or 232 having a magnetic disk 202 or 236. However, the present invention may be applied for any other types of disk drives as would be apparent to one of ordinary skill in the art from the description herein.

In addition, any number of elements as illustrated and described herein is by way of example only. For example, the present invention has been described for three retry tables 302, 304, and 306 of FIG. 8. However, the support firmware includes sequences of instructions stored in the data storage unit 218 or 234 that when executed by the MPU 222 performs the steps of the main process of FIG. 6 and the subroutines of FIGS. 7, 9, and 10 for any number of retry tables.

Furthermore, the present invention has been described for performing error correction during a read/write operation in general within the disk drive 204 or 232. Such error correction may be performed when the disk drive 204 or 232 is already installed within a host system having the host machine 224. In that case, the error correction of the present invention is performed during a read/write operation by the host machine 224 during normal operation of the host system.

Figure 11:
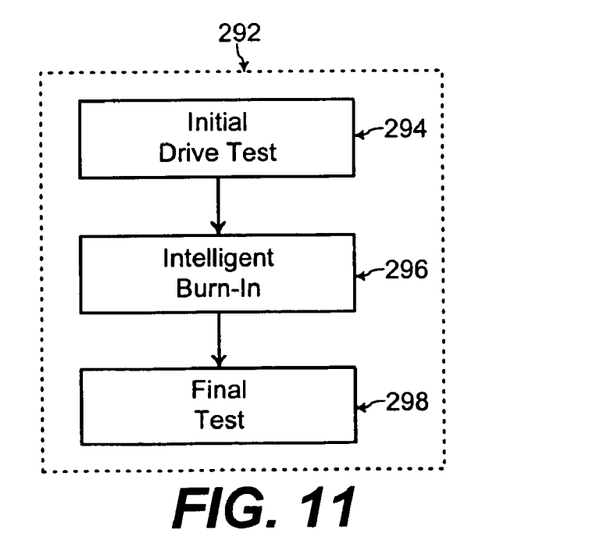
FIG. 11 shows typical steps for testing a disk drive during manufacture of the disk drive.

Alternatively, the present invention may also be used during testing of the disk drive 204 or 232. FIG. 11 illustrates a test process 292 with three main test steps 294, 296, and 298 during manufacture of a disk drive as described in U.S. Pat. No. 6,467,153. In such a test process, the disk drive 204 or 232 is tested by interfacing with the test system 224 before being installed into any host system. After assembling the components of the disk drive during manufacture, an initial drive test 294 is performed for testing for power-on, drive ready check, and basic operational check of the writing, reading, and seeking processes.

Thereafter, an intelligent burn-in 296 is performed for checking the basic functionality of the disk drive, for defect discovery and management, and for calibrating the disk drive to determine the optimum operating parameters for the disk drive. In the final test 298, the operation of the disk drive is verified with the results of the intelligent burn-in.

The present invention may be applied during the intelligent burn-in 296 for determining the optimum operating parameters for the disk drive 204 or 232 during manufacture. In that case, the plurality of retry tables with various ranges of operating parameters are used as described herein to determine such optimum operating parameters for a more flexible and adaptive intelligent burn-in 296.

The present invention is limited only as defined in the following claims and equivalents thereof.

The invention claimed is:

1. A method for performing error correction in a disk drive, comprising:
storing a plurality of retry tables in a data storage unit, wherein the retry tables include different ranges of values for a same set of a plurality of parameters used during a plurality of retries such that two retry tables have at least one of different respective maximum values and different respective minimum values for different respective ranges of a given parameter in the two retry tables, and wherein the retry tables are not changed after being stored in the data storage unit; and
selecting one of the retry tables to be used for the error correction.

2. The method of claim 1, wherein firmware is not modified for using any of the plurality of retry tables during the error correction.

3. The method of claim 1, wherein one of the retry tables becomes eventually selected as being optimum for the error correction depending on an application, operating conditions, and head/mechanical characteristics of the disk drive.

4. The method of claim 1, further comprising: determining that parameter values from a first selected table do not achieve error correction for a read/write command; and
using another selected one of the retry tables during a maximum number of allowed retries for the same read/write command.

5. The method of claim 1, wherein the data storage unit storing the plurality of retry tables is a maintenance cylinder of the disk drive.

6. The method of claim 5, wherein the disk drive includes a magnetic disk having the maintenance cylinder.

7. The method of claim 1, wherein the data storage unit storing the plurality of retry tables is a memory unit apart from a disk of the disk drive.

8. The method of claim 1, wherein the error correction is performed during an intelligent burn-in test for manufacturing the disk drive.

9. The method of claim 8, further comprising:
determining parameter values from one of the plurality of retry tables for optimum performance of the disk drive during the intelligent burn-in test.

10. The method of claim 1, wherein the error correction is performed during a read/write operation within a host system of the disk drive.

11. The method of claim 1, wherein each retry table determines a respective unique sequence of retry parameters to be retried with the respective sequence not changed for each retry table.

12. A system for performing error correction in a disk drive, comprising:
a first data storage unit for storing a plurality of retry tables, wherein the retry tables include different ranges of values for a same set of a plurality of parameters used during a plurality of retries such that two retry tables have at least one of different respective maximum values and different respective minimum values for different respective ranges of a given parameter in the two retry tables, and wherein the retry tables are not changed after being stored in the first data storage unit;
a processor; and
a second data storage unit having sequences of instructions stored thereon, wherein execution of the sequences of instructions by the processor causes the processor to perform the step of:
selecting one of the retry tables to be used for the error correction.

13. The system of claim 12, wherein one of the retry tables becomes eventually selected as being optimum for the error correction depending on an application, operating conditions, and head/mechanical characteristics of the disk drive.

14. The system of claim 12, wherein execution of the sequences of instructions by the processor causes the processor to further perform the steps of:
determining that parameter values from a first selected table do not achieve error correction for a read/write command; and
using another selected one of the retry tables during a maximum number of allowed retries for the same read/write command.

15. The system of claim 12, wherein the first data storage unit storing the plurality of retry tables is a maintenance cylinder of the disk drive.

16. The system of claim 15, wherein the disk drive includes a magnetic disk having the maintenance cylinder.

17. The system of claim 12, wherein the first and second data storage units are part of a memory unit apart from a disk of the disk drive.

18. The system of claim 12, wherein the error correction is performed during an intelligent burn-in test for manufacturing the disk drive.

19. The system of claim 18, wherein execution of the sequences of instructions by the processor causes the processor to further perform the step of:
determining parameter values from one of the plurality of retry tables for optimum performance of the disk drive during the intelligent burn-in test.

20. The system of claim 12, wherein the error correction is performed during a read/write operation within a host system of the disk drive.

21. The system of claim 12, wherein each retry table determines a respective unique sequence of retry parameters to be retried with the respective sequence not changed for each retry table.

22. The system of claim 12, wherein firmware is not modified for using any of the plurality of retry tables during the error correction.

23. A system for performing error correction in a disk drive, comprising:
means for storing a plurality of retry tables, wherein the retry tables include different ranges of values for a same set of a plurality of parameters used during a plurality of retries such that two retry tables have at least one of different respective maximum values and different respective minimum values for different respective ranges of a given parameter in the two retry tables, and wherein the retry tables are not changed after being stored; and means for selecting one of the retry tables to be used for the error correction.

24. The system of claim 21, wherein the plurality of retry tables is stored in a memory unit apart from a disk of the disk drive.

25. The system of claim 23, wherein the error correction is performed during an intelligent burn-in test for manufacturing the disk drive.

26. The system of claim 23, wherein the error correction is performed during a read/write operation within a host system of the disk drive.

27. The system of claim 23, wherein firmware is not modified for using any of the plurality of retry tables during the error correction.

28. The system of claim 23, wherein the plurality of retry tables is stored in a maintenance cylinder of the disk drive.

29. The system of claim 23, wherein each retry table determines a respective unique sequence of retry parameters to be retried with the respective sequence not changed for each retry table.

* * * * *